United States Patent
Shan et al.

(10) Patent No.: US 10,685,281 B2
(45) Date of Patent: Jun. 16, 2020

(54) AUTOMATED PREDICTIVE MODELING AND FRAMEWORK

(71) Applicant: Microsoft Technology Licensing, LLC, Redmond, WA (US)

(72) Inventors: Ying Shan, Sammamish, WA (US); Thomas Ryan Hoens, Bellevue, WA (US); Jian Jiao, Bothell, WA (US); Haijing Wang, Sammamish, WA (US); Dong Yu, Bothell, WA (US); JC Mao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 648 days.

(21) Appl. No.: 15/226,196

(22) Filed: Aug. 2, 2016

(65) Prior Publication Data

US 2017/0236056 A1     Aug. 17, 2017

Related U.S. Application Data

(60) Provisional application No. 62/294,792, filed on Feb. 12, 2016.

(51) Int. Cl.
*G06N 3/08* (2006.01)
*G06F 16/951* (2019.01)
(Continued)

(52) U.S. Cl.
CPC ............ *G06N 3/08* (2013.01); *G06F 16/951* (2019.01); *G06N 3/0481* (2013.01); *G06Q 10/04* (2013.01); *G06Q 30/0242* (2013.01)

(58) Field of Classification Search
CPC ...... G06N 3/08; G06N 3/0481; G06F 16/951; G06F 16/953; G06F 16/9532;
(Continued)

(56) References Cited

U.S. PATENT DOCUMENTS 8,548,951 B2    10/2013  Solmer et al.
2002/0133587 A1*  9/2002  Ensel ............... H04L 43/00
                                                 709/224
(Continued)

OTHER PUBLICATIONS

Jou et al., "Deep Cross Residual Learning for Multitask Visual Recognition," in Proceedings of the 24th ACM Intl. Conf. Multimedia, ACM (2016). (Year: 2016).*
(Continued)

*Primary Examiner* — Kamran Afshar
*Assistant Examiner* — Ryan C Vaughn
(74) *Attorney, Agent, or Firm* — Jeffrey L. Ranck; Ranck IP Law

(57) ABSTRACT

Systems and methods for providing a predictive framework are provided. The predictive framework comprises plural neural layers of adaptable, executable neurons. Neurons accept one or more input signals and produce an output signal that may be used by an upper-level neural layer. Input signals are received by an encoding neural layer, where there is a 1:1 correspondence between an input signal and an encoding neuron. Input signals for a set of data are received at the encoding layer and processed successively by the plurality of neural layers. An objective function utilizes the output signals of the topmost neural layer to generate predictive results for the data set according to an objective. In one embodiment, the objective is to determine the likelihood of user interaction with regard to a specific item of content in a set of search results, or the likelihood of user interaction with regard to any item of content in a set of search results.

12 Claims, 8 Drawing Sheets

(51) Int. Cl.
  *G06Q 30/02* (2012.01)
  *G06Q 10/04* (2012.01)
  *G06N 3/04* (2006.01)

(58) Field of Classification Search
  CPC .............. G06F 16/9538; G06Q 10/04; G06Q 30/0242; G06Q 30/0276
  See application file for complete search history.

(56) References Cited

U.S. PATENT DOCUMENTS

| | | | |
|---|---|---|---|
| 2009/0119343 A1 | 5/2009 | Jiao et al. | |
| 2009/0300417 A1* | 12/2009 | Bonissone | G05B 23/0254 714/26 |
| 2013/0159320 A1 | 6/2013 | Gao et al. | |
| 2014/0279773 A1 | 9/2014 | Chen et al. | |
| 2015/0074027 A1 | 3/2015 | Huang et al. | |
| 2015/0081695 A1* | 3/2015 | Schillings | G06F 16/9535 707/736 |
| 2015/0293976 A1 | 10/2015 | Guo et al. | |
| 2015/0363688 A1 | 12/2015 | Gao et al. | |

OTHER PUBLICATIONS

Long et al., "Unsupervised Domain Adaptation with Residual Transfer Networks," in Advances in Neural Information Processing Systems 136-144 (2016). (Year: 2016).*

Moniz et al., "Convolutional Residual Memory Networks," arXiv preprint arXiv:1606.05262 (2016). (Year: 2016).*

Zhang, et al., "Deep Learning over Multi-field Categorical Data: A Case Study on User Response Prediction", In Journal of Computing Research Repository, Jan. 2016, 12 pages.

Narayan, et al., "Sparse Combinatorial Autoencoders", In Proceedings of Twenty-seventh Annual Conference on Neural Information Processing Systems, Dec. 5, 2013, pp. 1-9.

Bi, et al., "Dimensionality Reduction via Sparse Support Vector Machines", In Journal of Machine Learning Research, vol. 3, Mar. 2003, pp. 1229-1243.

Law, Hiu Chung, "Clustering, Dimensionality Reduction, and Side Information", In PhD Dissertation of Michigan State University, Aug. 23, 2007, 207 pages.

Hinton, et al., "Reducing the Dimensionality of Data with Neural Networks", In Journal of Science, vol. 313, Jul. 28, 2006, pp. 504-507.

Agarwal, et al., "An Introduction to Computational Networks and the Computational Network Toolkit", In Microsoft Technical Report MSR-TR-2014-112, Aug. 2014, pp. 1-149.

Collobert, et al., "Natural Language Processing (Almost) from Scratch", In Journal of Machine Learning Research, vol. 12, Aug. 2011, pp. 2493-2537.

Dahl, et al., "Context-Dependent Pre-trained Deep Neural Networks for Large Vocabulary Speech Recognition", In Journal of IEEE Transactions on Audio, Speech, and Language Processing, vol. 20, No. 1, Jan. 2012, pp. 30-42.

Edelman, et al., "Internet Advertising and the Generalized Second-Price Auction: Selling Billions of Dollars Worth of Keywords", In Working Papers of National Bureau of Economic Research, Nov. 2005, pp. 1-21.

Fukushima, Kunihiko, "Neocognitron: A Self-organizing Neural Network Model for a Mechanism of Pattern Recognition Unaffected by Shift in Position", In Journal of Biological Cybernetics, vol. 36, Issue 4, Apr. 1980, pp. 193-202.

He, et al., "Deep Residual Learning for Image Recognition", In Journal of Computing Research Repository, Dec. 2015, pp. 1-12.

Hinton, et al., "Deep Neural Networks for Acoustic Modeling in Speech Recognition: The Shared Views of Four Research Groups", In Journal of Signal Processing Magazine, Nov. 2012, pp. 82-97.

Huang, et al. "Learning Deep Structured Semantic Models for Web Search using Clickthrough Data", In Proceedings of 22nd ACM International Conference on Information & Knowledge Management, Oct. 27, 2013, pp. 2333-2338.

Krizhevsky, et al., "ImageNet Classification with Deep Convolutional Neural Networks", In Proceedings of Twenty-sixth Annual Conference on Neural Information Processing Systems, Dec. 3, 2012, pp. 1-9.

Lecun, et al., "Gradient-based Learning applied to Document Recognition", In Proceedings of IEEE, vol. 86, Issue 11, Nov. 1998, pp. 1-46.

Lowe, David G., "Object Recognition from Local Scale-Invariant Features", In Proceedings of International Conference on Computer Vision, Sep. 1999, pp. 1-8.

Mikolov, et al., "Distributed Representations of Words and Phrases and their Compositionality", In Proceedings of Twenty-seventh Annual Conference on Neural Information Processing Systems, Dec. 5, 2013, pp. 1-9.

Rendle, Steffen, "Factorization Machines", In Proceedings of IEEE 10th International Conference on Data Mining, Dec. 13, 2010, 6 pages.

Schmidhuber, Jürgen, "Deep learning in neural networks: An overview", In Journal of Neural Networks, vol. 51, Jan. 2015, pp. 1-66.

Shen, et al., "Learning semantic representations using convolutional neural networks for web search", In Proceedings of 23rd International Conference on World Wide Web, Apr. 7, 2014, pp. 373-374.

Deng, et al., "Deep Learning: Methods and Applications", In Journal of Foundations and Trends® in Signal Processing, vol. 7, Issue No. 3-4, Jun. 30, 2014, 195 Pages.

Goldberg, Yoav, "A Primer on Neural Network Models for Natural Language Processing", In Journal of Artificial Intelligence Research, vol. 57, Oct. 5, 2015, 76 Pages.

"International Search Report and Written Opinion Issued in PCT Application No. PCT/US2017/016759", dated Apr. 28, 2017, 18 Pages.

"Office Action Issued in European Patent Application No. 17704984.8", dated Nov. 19, 2019, 9 Pages.

* cited by examiner

AUTOMATED PREDICTIVE MODELING AND FRAMEWORK

CROSS-REFERENCE TO RELATED MATTERS

This application claims the benefit of provisional patent application, U.S. Patent Application No. 62/294,792, filed Feb. 12, 2016, which is incorporated herein by reference.

BACKGROUND

A challenge for search engine providers is to be able to predict the likelihood that a person will interact with a given item of content. Stated in the context of multiple items of a search results page, one question that arises is: with which of all the search results and/or items of content in a search results page will the person select or interact?

In order to generate probabilities/likelihoods regarding user interaction with any given item of content on a search results page, or a specific item of content, search engine providers utilize and combine a wide range of criteria, conditions, and/or factors into a formula (or set of formulae) to generate the various probabilities and likelihoods of user interaction. However, while the results (probabilistic determinations) of the formulas are determined according to query logs and training models, the formulae are human crafted by one or more persons. These "encoders" select from the various signals (i.e., the criteria, conditions, and/or factors that are available to the search engine in regard to receiving a query) and, based on their expertise and intuition, determine how to interpret, condition, combine and weight the selected signals, and then produce the formula (or formulae) that generates a number representing a probability or likelihood of user interaction.

Obviously, when the formulae are generated according to a particular person's (or group of persons') expertise, experience and intuition, expansion and modifications are also the product of intuition and experimentation. Also, if an encoder leaves the group or company, a void is created and institutional knowledge regarding "how" and "why" a formula is crafted in a certain manner is often lost. For example, if a particular signal is no longer available, or if additional signals become available, modifying a given formula requires the expertise, experimentation, and intuition that was needed to generate the formula in the first place, and the person that originally crafted the formula may or may not still be available to assist. In short, these human-crafted formulae are fragile and unmanageable.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for providing a predictive framework are provided. The predictive framework comprises plural neural layers of adaptable, executable neurons. Neurons accept one or more input signals and produce an output signal that may be used by an upper-level neural layer. Input signals are received by an encoding neural layer, where there is a 1:1 correspondence between an input signal and an encoding neuron. Input signals for a set of data are received at the encoding layer and processed successively by the plurality of neural layers. An objective function utilizes the output signals of the topmost neural layer to generate predictive results for the data set according to an objective. In one embodiment, the objective is to determine the likelihood of user interaction with regard to a specific item of content in a set of search results, or the likelihood of user interaction with regard to any item of content in a set of search results.

According to additional aspects of the disclosed subject matter, a computer-implemented framework for providing predicted results is presented. The framework comprises a plurality of neural layers including a plurality of middle neural layers and an encoding layer. The framework also comprises an objective function. Regarding the plurality of neural layers, each neural layer comprises a plurality of neurons, where each neuron is an executable object that accepts one or more inputs and generates an output. The encoding layer is the first neural layer and comprises a plurality of encoding neurons having a 1:1 correspondence with a plurality of input signals for a set of data to evaluate/process. The objective function, in execution, determines predicted results from the output signals of a topmost neural layer of the plurality of neural layers according to a predetermined objective. In operation, the objective function determines the predicted results from the output signals of the topmost neural layer according to the predetermined objective and provides the predicted results to a requesting party.

According to further aspects of the disclosed subject matter, a computer system configured to generate predicted results with regard to base data is presented. The computer system includes a processor and a memory, where the processor executes instructions stored in the memory as part of or in conjunction with additional executable components to generate the predicted results. The additional components include an executable predictive framework and a results analysis module. Regarding the framework, the framework includes a plurality of neural layers comprising a plurality of middle neural layers and an encoding layer. Each neural layer comprises a plurality of neurons, where each neuron is an executable object that accepts one or more inputs and generates an output. The encoding layer is the first neural layer and comprises a plurality of encoding neurons having a 1:1 correspondence with a plurality of input signals for a set of data to evaluate. The objective function determines predicted results from the output signals of the topmost neural layer of the framework according to a predetermined objective. In operation, the framework obtains input signals by way of the encoding layer and processes the input signals successively through the plurality of neural layers to the topmost neural layer where the objective function takes the output signals and generates predictive data. Additionally, a results analysis module obtains the predicted results for a set of data, determines the accuracy of the predicted results in view of actual results regarding the set of data, and generates corrective data for the framework according to the predicted results and the actual results. The corrective data is then back-propagated through the framework to update the current model of the predictive framework.

According to still further aspects of the disclosed subject matter, a computer-implemented method for determining predicted results for a set of data is presented. The method includes the step of providing an executable predictive framework, where the framework operates according to a validated model. The framework comprises a plurality of neural layers comprising a plurality of middle neural layers and an encoding layer. Each neural layer comprises a plurality of neurons, where each neuron is an executable object that accepts one or more inputs and generates an output. The encoding layer is the first neural layer and comprises a plurality of encoding neurons having a 1:1 correspondence with a plurality of input signals for a set of data to evaluate. An objective function determines predicted results from the output signals of the topmost neural layer of the plurality of neural layers according to a predetermined objective. In execution, the framework obtains input signals for a set of data to evaluation by way of the encoding layer and processes the input signals successively through the plurality of neural layers to a topmost neural layer. The method further includes obtaining input signals corresponding to a set of data for processing by the predictive framework. The set of data is processed by the predictive framework. The predictive results are obtained from the objective function and provided to a requesting party.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
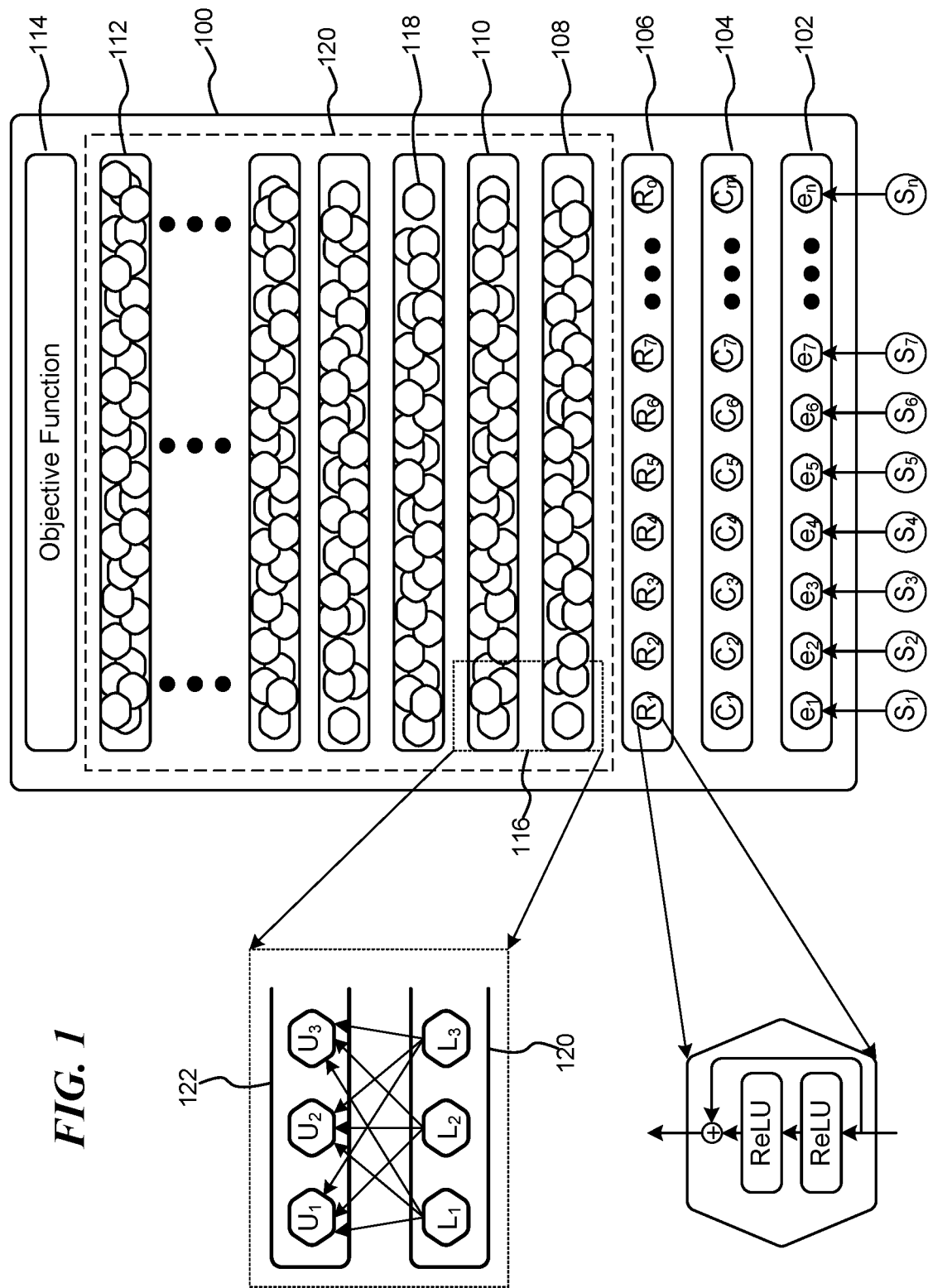
FIG. 1 is a pictorial diagram illustrating an exemplary network environment suitable for implementing aspects of the disclosed subject matter.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

By way of definition as used herein, the term "neuron" refers to an executable object (a software object, a hardware object, or a combination of the two) that accepts one or more inputs and generates an output. Generally speaking, a neuron performs interpretive, combinatorial, and transformative operations of the various input signals to produce an output signal. Each neuron executes according to a set of predetermined functions (which may be unique or shared among other neurons of the neural layer in which it resides) in order to identify some characteristic from the inputs. Each neuron also includes state information, reflecting the current state of functionality as well as weightings assigned to input signals. Neurons may also include prior state information reflecting previous states of the neurons. As a whole, the neurons of each neural layer collectively comprise a current model of the predictive framework which governs how predicted data are generated from input signals.

The term "neural layer" refers to an arrangement or collection of neurons that accepts inputs/signals from neurons of a lower level (or input/signals that have not yet been processed by a neural layer) and generates outputs/signals for an upper layer. Generally, neurons of the same neural layer do not interact with each other with regard to signals, i.e., one neuron of a neural layer does not provide input to or utilize output from another neuron of the same neural layer.

In contrast to a human-crafted formula for generating predictive results, a framework for automated predictive modeling and generation is presented. Advantageously, input is accepted without regard to human combinatorial efforts. According to aspects of the disclosed subject matter, deep learning techniques employing multiple layers of neural networks are utilized to automatically combine, transform and process multiple input signals in order to identify probabilities of user interaction with an item of content, such as (by way of illustration and not limitation): search results, advertisements, information links, a search results page, and the like. Additionally, while much of the discussion of the disclosed subject matter is cast in regard to predicting user interaction with regard to one or more items of content among search results, it is anticipated that the disclosed subject matter may be suitably applied to other scenarios in which predictive results are desired, utilizing multiple neural layers that include an encoding layer having a 1:1 correspondence between input signals and encoding neurons, training models, a suitably configured objective function and back-propagation of results. By way of illustration and not limitation, the objective function of a predictive framework may be suitably configured to conduct regression analysis, classifications, and rankings in a variety of fields including image processing, speech processing, finance, and the like.

As suggested above, while the number of possible combinations of signals increases logarithmically with human-crafted formulae, according to the disclosed subject matter the number of human-crafted elements (i.e., neurons) increases linearly with the number of signals used. More particularly, rather than utilizing human-crafted and curated combinations, to input signals into the framework the disclosed subject matter utilizes encoding neurons in a 1:1 (one to one) correspondence with input signals. In other words, for each input signal, there is an encoding neuron in what is referred to as the encoding layer. An encoding neuron is associated with a particular signal and encodes that input signal into a format that can be utilized by the other neural layers of the framework, irrespective of any other input signal that is input to the framework. Indeed, combinations of signals in order to identify the objective (e.g., the likelihood of user interaction with an item of content) are automatically generated and processed through the various neural layers of the framework. As will be discussed below, the processing of input signals causes the framework to refine its operations in light of the predetermined objective according to a training data set and validated according to validation data sets.

Turning then to the figures, FIG. 1 is a block diagram illustrating an exemplary framework 100 for modeling and generating predictive information regarding whether a person/computer user will interact with an item of content, or with one or more items of content in a search results page. According to aspects of the disclosed subject matter, the framework 100 includes a plurality of neural layers 102-112 and an objective function 114. Generally speaking, each of the neural layers comprise a plurality of neurons, such as neurons 118, $e_1$-$e_n$, $C_1$-$Cm$, and $R_1$-$R_o$. As discussed above, each neuron executes according to a set of predetermined functions (which may be unique or shared among other neurons of the network layer in which it resides) in order to identify some characteristic from the inputs that it receives. The output of a neuron from a lower level is then provided as input to one or more neurons of the neuron layer immediately above, where "above" and "below" (and "upper" and "lower") refer to processing order of neural layers. For example, with regard to box 116, neurons $L_1$-$L_3$ are on a lower neural layer 120 and the output of these neurons are input signals to neurons $U_1$-$U_3$ on the upper neural layer 122. In this example, the lower neural layer 120 is "below" the "upper" neural layer 122 in regard to the processing flow of data.

In regard to the input that each neuron receives, each of the various neurons may individually associate and control the weight that is attributed to the input signals that the neuron receives. For example, neuron $U_1$, which receives inputs from neurons $L_1$-$L_3$, may associate different weighting values to the input signals, i.e., neuron $U_1$ may weight (i.e., assign a weight to) the input signal from neuron $L_2$ as zero, effectively ignoring the input altogether, and associate other weights to the input signals from neurons $L_1$ and $L_3$.

As indicated above, beginning with input signals $S_1$-$S_n$, these signals are processed through the various neural levels of the framework 100, i.e., a deep learning framework, each neural layer producing more and more abstract results (output signals) until, at the topmost level, the objective function 114 utilizes (according to its own functions, weighting factors, and heuristics) the output signals of the topmost neural layer 112 according to a predetermined objective, e.g., to generate a likelihood of user interaction with one or more items of content within a set of search results or, alternatively, a likelihood of user interaction with regard to a particular item of content in a set of search results.

By way of illustration and not limitation, input signals $S_1$-$S_n$ may correspond to a variety of factors including: user identification (i.e., the user to which the set of search results are presented); query; entity/subject matter of the query; keywords; advertiser; advertisement campaign; time of day; day of week; holiday; season; gender of the user; advertisement; and the like. Indeed, these signals often correspond to the same signals that encoders use, in combination, to generate their predictions as to user interaction and, in many cases, correspond to thousands of signals for consideration. These signals are inputs to a first neural layer 102, referred to as an encoding layer.

As indicated above and according to aspects of the disclosed subject matter, the encoding layer 102 typically has a 1:1 correspondence between input signals and neurons. Each neuron $e_1$-$e_n$ is encoded such that it can receive the corresponding input signal and encode it such that the data/input signal can be utilized by other neurons in the framework 100. By way of illustration and not limitation, an input signal representing a query submitted by a computer user may be encoded into 3-letter N-grams and mapped into a matrix of all potential 3-letter N-grams (a matrix or vector of approximately 56,000 entries.) Of course, the content of certain input signals, such as an input signal representing the time of day, may not require encoding. In such cases, the encoding neuron may be optionally excluded or be encoded to do nothing but to pass the information through.

A condensing layer 104, sometimes called a stacking layer, optionally included and positioned just above the encoding layer 102, is provided to reduce the sparsity or data size of the output signals from the encoding neurons $e_1$-$e_n$. Typically, the condensing layer 104 also has a 1:1 correspondence between input signals (i.e., the output signals of the encoding neurons) and condensing neurons $C_1$-$C_n$. By way of illustration and with regard to the example above regarding the matrix/vector of 3-letter N-grams, the matrix of N-grams will typically be extremely sparse matrix: i.e., perhaps less than a dozen non-zero entries in an otherwise empty matrix of 56,000 entries. Obviously, an input signal that is sparse requires substantial processing and storage concerns. Accordingly, the corresponding condensing neuron of the condensing layer is tasked with reducing the sparsity or size of the input signal into a denser format without a loss of fidelity, i.e., the condensed signal accurately represents the underlying information. Of course, just as with the encoding neurons, the content of certain input signals, such as an input signal representing the time of day, may not require condensing. In such cases, the condensing neuron of a condensing layer may be optionally excluded or be encoded to do nothing but to pass the information through.

A third, residual layer 106 is optionally included in the framework 100 and resides immediately above the condensing layer 104. The unique structure of each residual neuron $R_1$-$R_n$ (where n denotes the number of input signals) is to add back elements of an input signal after two layers of rectified linear operations (ReLU) to identify a per-element maximum operator, as shown in FIG. 1 as the exploded diagram of residual neuron $R_1$. In similar manner with the previous 2 neural layers, the residual layer typically has a 1:1 correspondence between input signals (i.e., the output signals of the condensing neurons) and residual neurons $R_1$-$R_n$.

While the first layers described above typically comprise a 1:1 correspondence between input signals and layer neurons, the "middle" neural layers are not so constrained. Indeed, each middle neural layer may comprise many more neurons than there are input signals for the layer and each neuron may accept any number of the available input signals. According to aspects of the disclosed subject matter, a suitably configured framework, such as framework 100, may include a plurality of middle neural layers. While framework 100 illustrates five middle neural layers, including neural layers 108-112, the disclosed subject matter is not so constrained. Indeed, as the ellipses indicate, there may be any number of middle neural layers, though typically at least three are utilized to achieve the desired results.

Additionally and according to further embodiments of the disclosed subject matter, one or more neurons of a middle neural layer receives all of the output signals of the previous, lower neural layer. Indeed, it may be common that each of the neurons of a given middle neural layer receive each of the output signals of the previous neural layer as input signals. Typically, though not exclusively, neurons of a given neural layer are encoded to process the input signals in a manner that is unique among the other neurons of the neural layer. Various weightings assigned to input signals, combinatorial directives and processing, and other encoding provide diversity among the various neurons of a neural layer. Further still, the number of neurons in a first middle level, such as neuron level 108, need not match the number of neurons in another middle level, such as neuron levels 110 or 112.

The objective function 114 accepts the output signals of the neurons of the topmost neural layer 112 and performs the final analysis of the signals to produce an output: a likelihood of user interaction with regard to the basis data (i.e., the basis from which the input signals $S_1$-$S_n$ are drawn.) In regard to an item of content of a search result, the produced output is the likelihood of user interaction with regard to that item, or in regard to a search results page, the produced output is the likelihood of user interaction with an item of content within the search results page.

Figure 2:
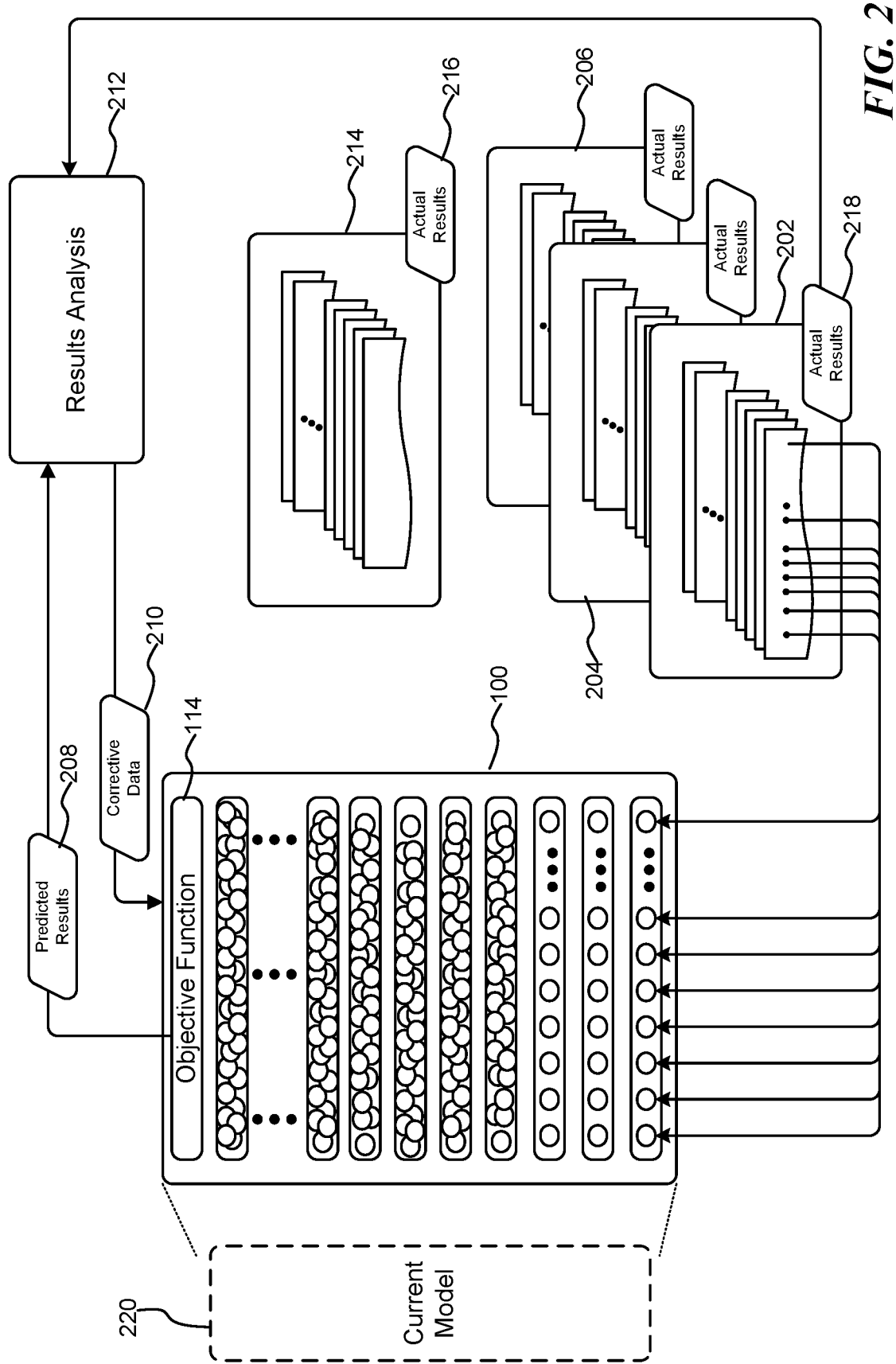
FIG. 2 is a block diagram illustrating the exemplary framework with regard to training and validation of the framework.

In order to ensure that the exemplary framework 100 generates reliable results, the framework must be trained. Turning to FIG. 2, FIG. 2 is a block diagram illustrating the exemplary framework 100 with regard to training and validation of the framework. Indeed, in order to train the framework, one or more sets of training data 202-206 are utilized. More particularly, input signals corresponding to the sets of training data are identified and supplied to the framework, which processes the data as set forth above. The objective function 114, based on the processing of the input signals, generates predicted results 208. These predicted results are then supplied to a results analysis service 212 that accesses the actual results corresponding to the current set of training data, such as actual results 218. Based on the actual results, the results analysis service 212 determines/identifies corrective data with regard to the predicted results, and provides the corrective data 210 to the framework 100 (via the objective function 114) with regard to the current set of training data. Corrective data 210 includes indications as to what is incorrect with regard to the predicted results 208. For its part, the framework back-propagates the corrective data "down" through the neural layers, and in so doing, corrections to the operation of the various neurons of the various middle neuron layers may take place. These corrections may include associating different weights to the various input signals, transforming and/or combining results in a new manner, and the like.

As indicated, multiple sets of training data are used to train the framework 100 by way of processing and back-propagation of corrective data. At some point in the training of the framework, after some determined number of sets of training data are processed, a set of validation data is also processed. The set (or sets) of validation data are then processed through the framework 100 such that the objective function 114 generates predicted results 208 for the validation data. The results analysis service 212 accesses the actual results 216 corresponding to the set of validation data 214 to determine the performance/accuracy of the current state of the framework 100. However, in validating the current state of the framework 100, the results analysis service does not provide corrective data 210 for back-propagation as it does with sets of training data. The corrective data 210 is not provided to the framework 100 due to the desire to not have the framework train on the validation data 214 which might lead to the current model accurately predicting the results for the set of validation data 214 without being accurate with regard to other sets of data. Rather, the corrective data 210 is used to evaluate whether or not the current state of the framework 100 (referred to as the current model 220) meets one or more predetermined accuracy thresholds for predicting results. Upon determining that a current model meets or exceeds the predetermined accuracy thresholds, that model can then be used, in conjunction with the framework, for generating predictive results in regard to actual sets of data as illustrated in regard to FIG. 3.

Figure 3:
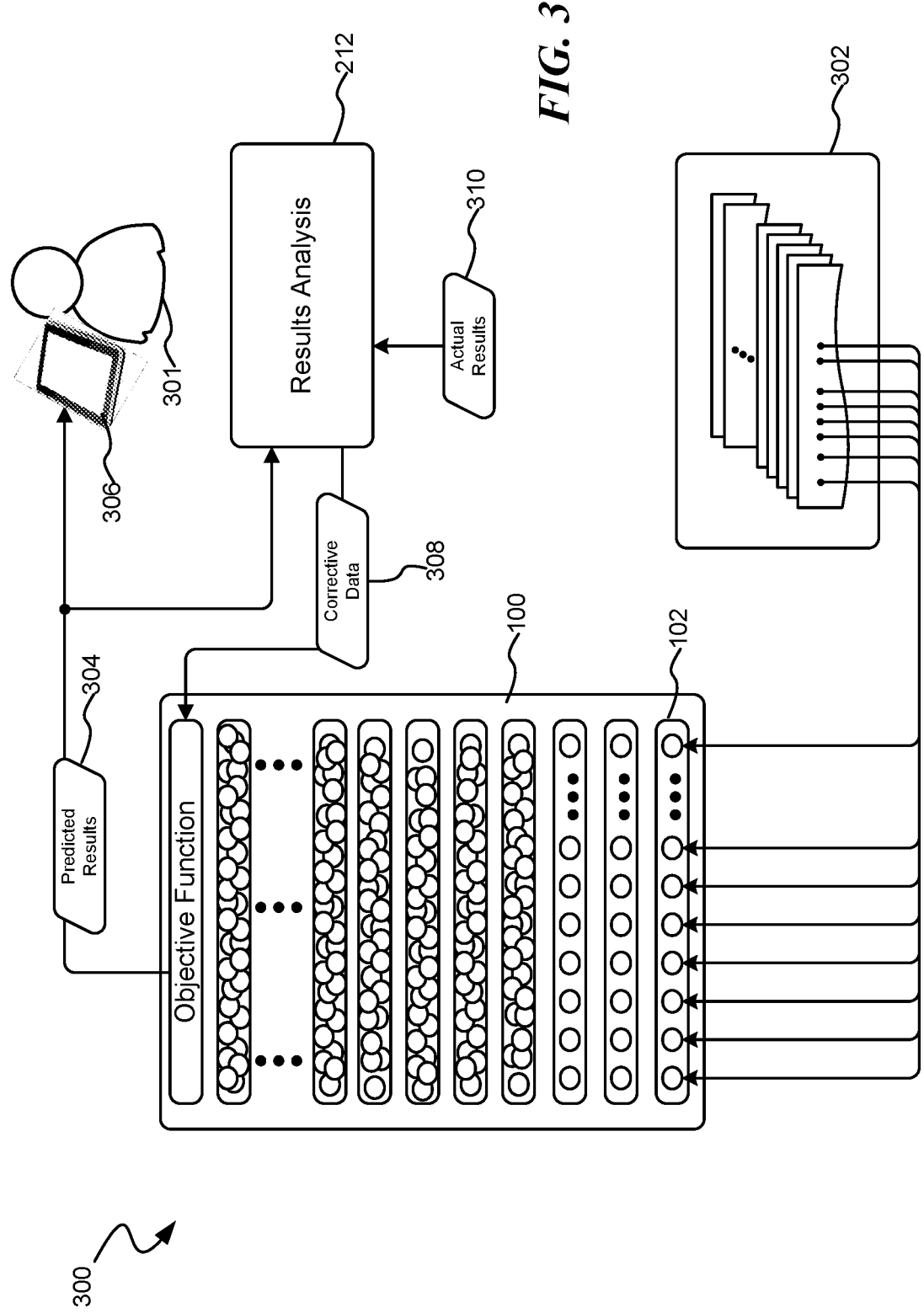
FIG. 3 is a block diagram illustrating an exemplary environment in which predictive results are provided to a computer user in regard to a request data set!

FIG. 3 is a block diagram illustrating an exemplary environment 300 in which predictive results are provided to a computer user 301 in regard to a request data set 302, i.e., a data set for which predictive results are requested. As described above, various input signals are identified from the request data set 302 and supplied to the framework 100 having a current model that has been validated to meet or exceed predetermined accuracy thresholds. Indeed, the input signals are provided to the framework 100 via the encoding layer 102. The input signals are then processed by the various layers of the framework such that the objective function 114 generates predicted results 304. These predicted results are then provided to the requesting computer user 301 via a computing device 306.

As part of an on-going learning process, in addition to providing the predicted results 304 to the requesting computer user 301, the predicted results are also provided to the results analysis process 212. The results analysis process then obtains actual results 310 regarding the objective (e.g., whether a computer user interacted with an item of content), typically from a search engine that provides the results to a requesting user, generates corrective data 308 according to the actual results, and provides the corrective data to the framework for back-propagation.

Figure 4:
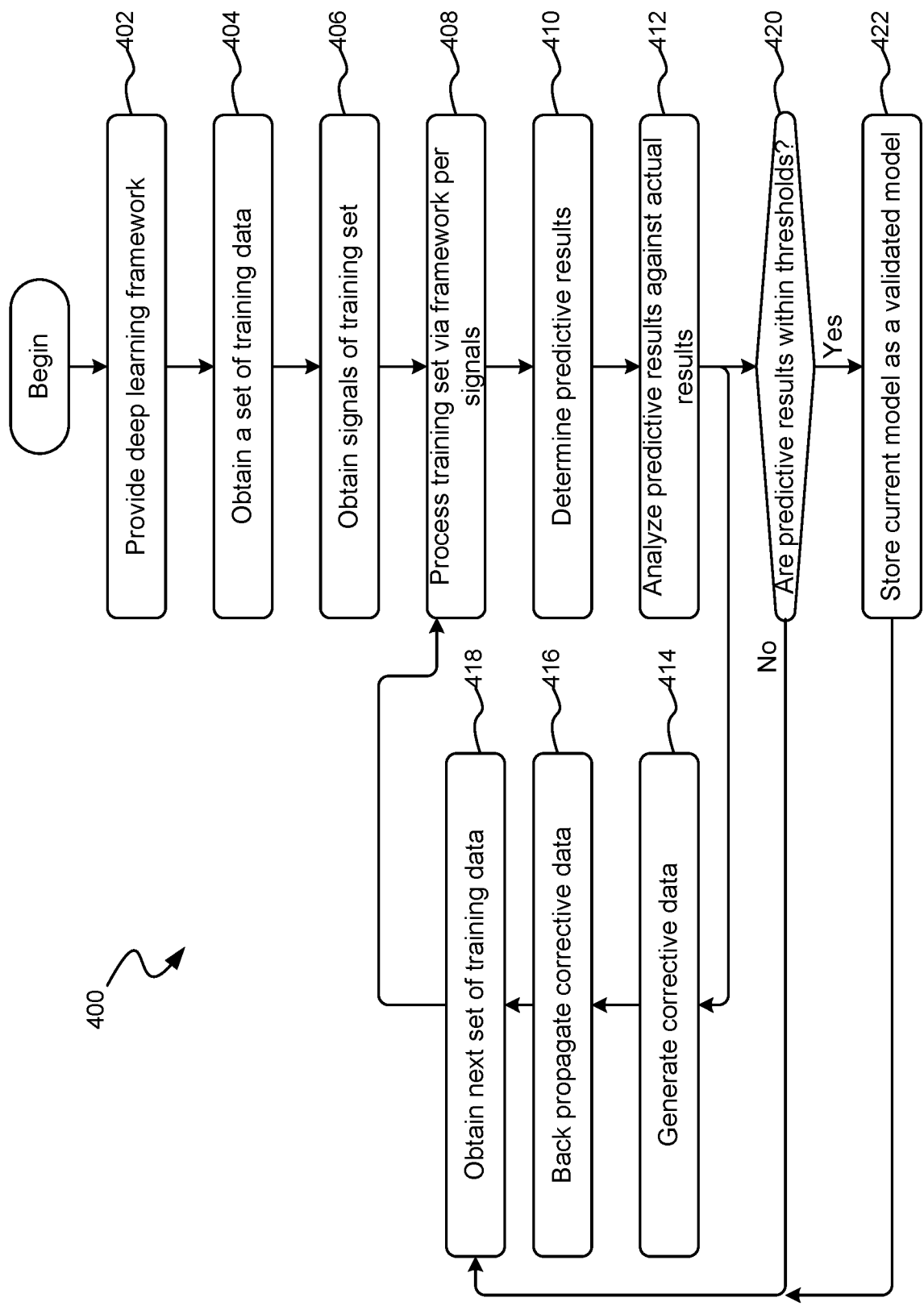
FIG. 4 is a flow diagram illustrating an exemplary routine suitable for training a predictive framework, such the framework of FIG. 1, according to aspects of the disclosed subject matter.

Turning now to FIG. 4, FIG. 4 is a flow diagram illustrating an exemplary routine 400 suitable for training a predictive framework, such as framework 100, according to aspects of the disclosed subject matter. Beginning at block 402, a framework suitable for deep learning, as described above in regard to framework 100 of FIG. 1 is provided. According to aspects of the disclosed subject matter, the framework includes an embedding layer 102 having a 1:1 correspondence between input signals and embedding neurons within the embedding layer. Additionally, a condensing layer 104 may also be optionally included, as well as a residual layer 106, each having a 1:1 correspondence between input signals (from the immediate lower level neural layer) to neurons.

At block 404 a first set of training data is obtained or accessed. At block 406, input signals corresponding to the currently processed training data are obtained. At block 408, the set of training data is processed by the framework 100 according to the input signals identified for the set of training data. Processing the input signals is described above in regard to FIG. 1.

At block 410, the predicted results are determined according to the objective function 114 and, at block 412, an analysis of the predicted results is conducted in view of/against the actual results.

At block 414, corrective data is generated in light of the predicted vs. actual results. At block 416, the corrective data is back-propagated through the various neural levels of the framework. At block 418, a next set of training data is obtained and the routine 400 returns to block 408 to continue processing training data.

Also shown in routine 400, periodically in conjunction with training the current model of the framework 100, validation for current workability and accuracy is also determined. At these times and as shown in decision block

420, a determination is made as to whether the current results (as determined by the current model of the framework) are within accuracy thresholds. As described above, validating a current model includes processing a set of validation data and examining the predicted results against the actual results. If the predicted results are within acceptable validation thresholds, at block 422 the framework's current model is stored as a validated model. Alternatively, if the predictive results are not within predetermined accuracy thresholds, the current model of the framework is not stored as a validated model.

It should be appreciated that while FIG. 4 illustrates the steps of 420 and 422 returning to block 418, this is for illustrative purpose of the routine 400 and should not be construed as a limiting embodiment. Indeed, validation of a current framework model may operate in a parallel thread with regard to processing sets of training, or be interspersed within the sets of training data. Of course, when processing a set of validation data (as described above) the corrective data and back-propagation typically do not occur in order to use the validation sets as validation sets, not training sets. Moreover, routine 400 does not include an ending step. While framework training may come to a close, the lack of an ending step is indicative of ongoing training of the framework, including using actual request data for training purposes.

Figure 5:
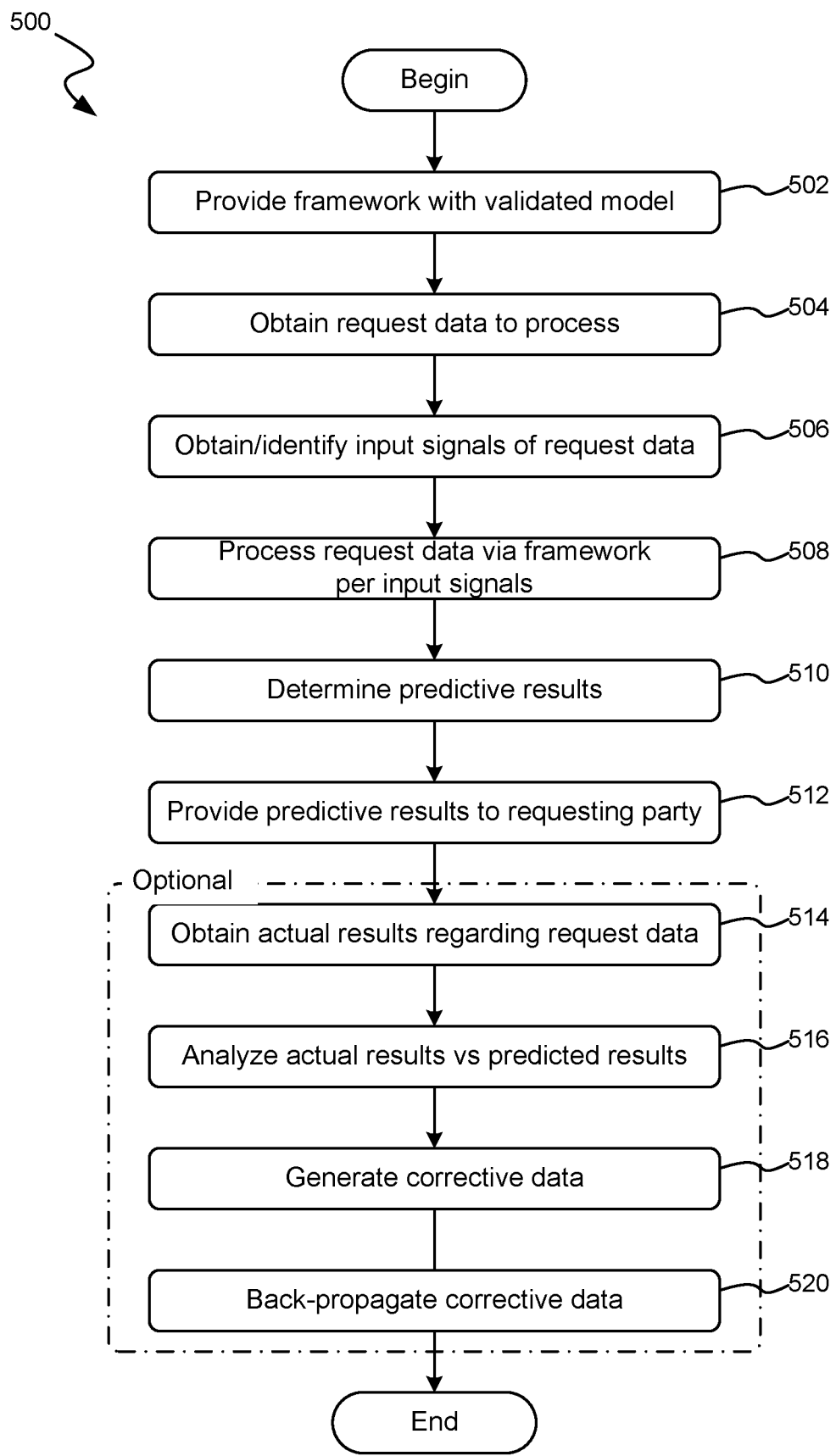
FIG. 5 is a flow diagram illustrating an exemplary routine for providing predictive results in regard to an actual set of data.

Turning now to FIG. 5, FIG. 5 is a flow diagram illustrating an exemplary routine 500 for providing predictive results in regard to an actual set of data. Beginning at block 502, a framework 100 with a validated model is provided. As suggested above, a validated model corresponds to a working model that has been validated as providing predictive results within predetermined accuracy thresholds.

At block 504, request data 302 is obtained for processing and, at block 506, input signals from the request data are obtained. At block 508, the request data, as represented by the obtained input signals, is processed by the framework 100, beginning with the encoding layer 102. At block 510, predictive results 304 are determined by the objective function 114 of the framework 100. At block 512, the predictive results are provided to the requesting party 301.

In addition to providing the predictive results and as an optional extension of routine 500, at block 514 actual results 310 corresponding to the request data 302 is accessed and, at block 516, an analysis of the predictive results is made by the results analysis service in view of the actual results. At block 518, corrective data 308 is generated and at block 520, the corrective data is back propagated through the framework 100 as described above in regard to FIGS. 1 and 3. Thereafter, routine 500 terminates.

Regarding routines 400 and 500 described above, as well as other processes describe herein, while these routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines and processes include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series.

Often, but not exclusively, the functionality of the various routines is embodied in software (e.g., applications, system services, libraries, and the like) that is executed on one or more processors of computing devices, such as the computing device described in regard to FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code modules comprising routines, functions, looping structures, selectors and switches such as if-then and if-then-else statements, assignments, arithmetic computations, and the like. However, as suggested above, the exact implementation in executable statements of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer readable media expressly excludes carrier waves and/or propagated signals.

Figure 6:
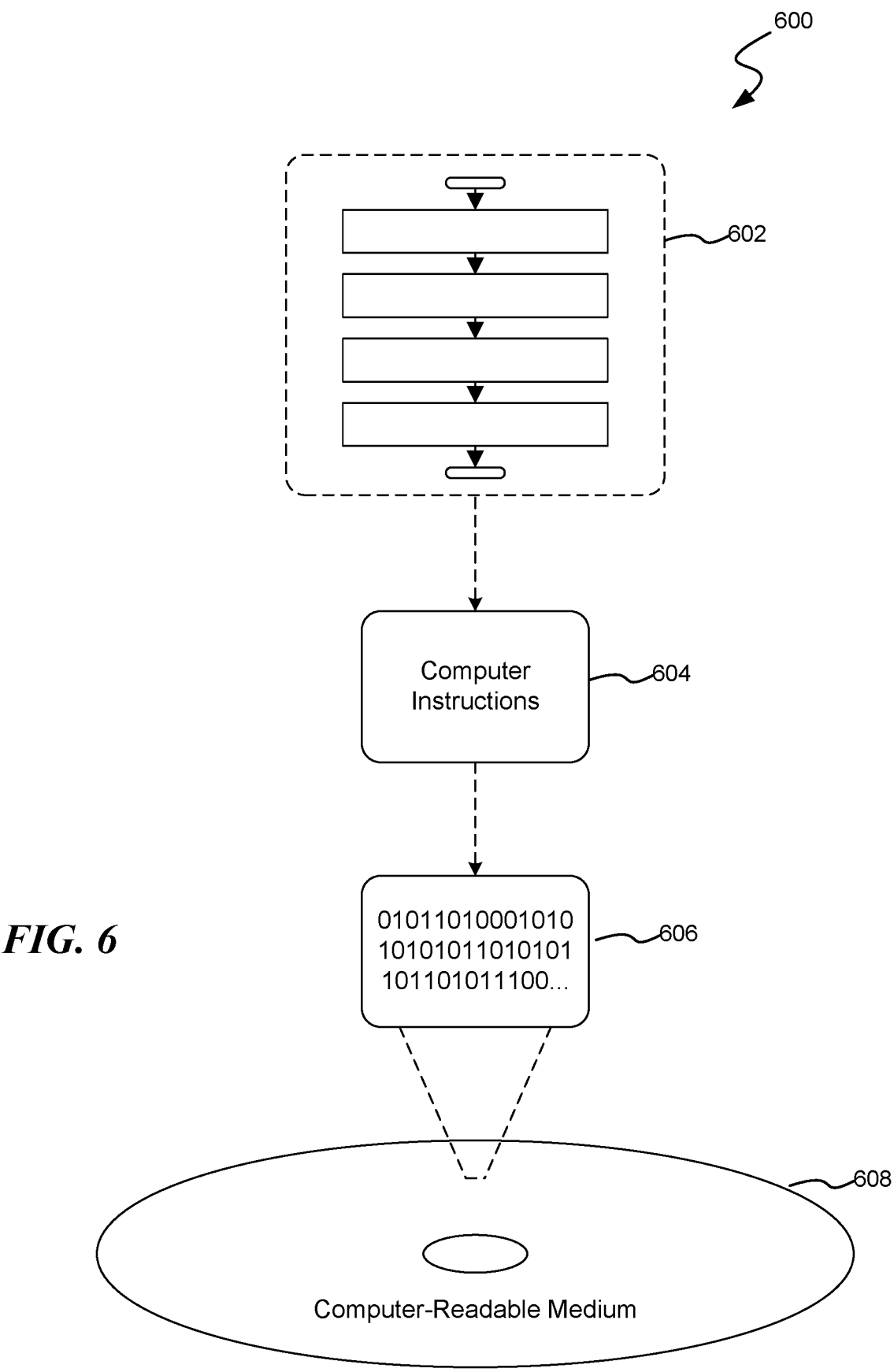
FIG. 6 is a block diagram illustrating an exemplary computer readable medium encoded with instructions to generate predictive results of a request data set.

Turning to FIG. 6, FIG. 6 is a block diagram illustrating an exemplary computer readable medium encoded with instructions to generate predictive results of a request data set as described above. More particularly, the implementation 600 comprises a computer-readable medium 608 (e.g., a CD-R, DVD-R or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary methods 400 and 500, for example. In another such embodiment, the processor-executable instructions 604 may be configured to implement a system, such as at least some of the exemplary system 700, as described below. Many such computer-readable media may be devised, by those of ordinary skill in the art, which are configured to operate in accordance with the techniques presented herein.

Figure 7:
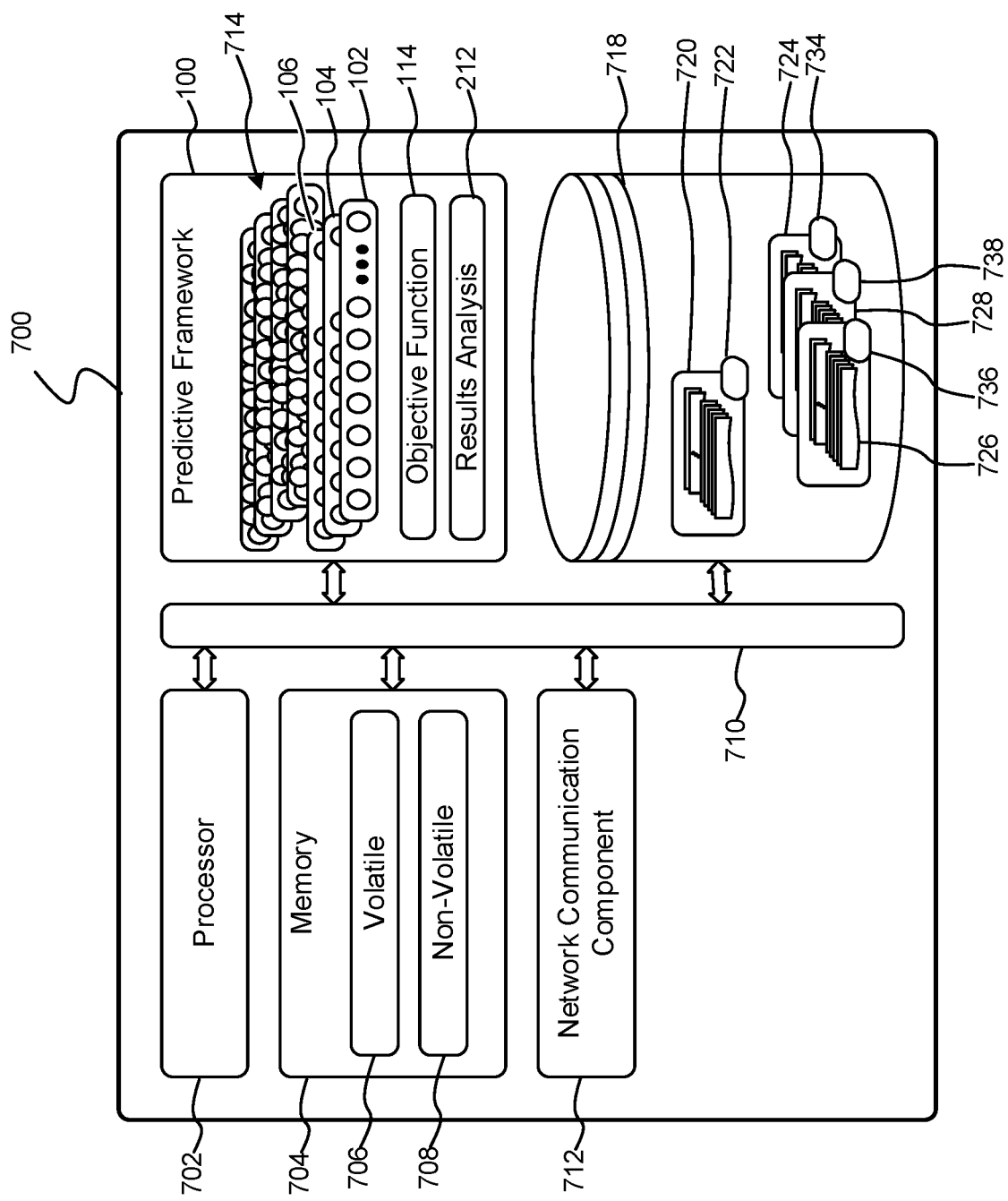
FIG. 7 is a block diagram illustrating an exemplary computing device configured to provide a framework for generating predictive results according to aspects of the disclosed subject matter.

Turning now to FIG. 7, FIG. 7 is a block diagram illustrating an exemplary computing device 700 configured to provide a framework for generating predictive results according to aspects of the disclosed subject matter. The exemplary computing device 700 includes one or more processors (or processing units), such as processor 702, and a memory 704. The processor 702 and memory 704, as well as other components, are interconnected by way of a system bus 710. The memory 704 typically (but not always) comprises both volatile memory 706 and non-volatile memory 708. Volatile memory 706 retains or stores information so long as the memory is supplied with power. In contrast, non-volatile memory 708 is capable of storing (or persisting) information even when a power supply is not available. Generally speaking, RAM and CPU cache memory are examples of volatile memory 706 whereas ROM, solid-state memory devices, memory storage devices, and/or memory cards are examples of non-volatile memory 708.

As will be appreciated by those skilled in the art, the processor 702 executes instructions retrieved from the memory 704 (and/or from computer-readable media, such as computer-readable media 600 of FIG. 6) in carrying out various functions of predictive framework 100 as set forth above. The processor 702 may be comprised of any of a number of available processors such as single-processor, multi-processor, single-core units, and multi-core units.

Further still, the illustrated computing device 700 includes a network communication component 712 for interconnecting this computing device with other devices and/or services over a computer network, including other user devices, such as user computing devices 306 of FIG. 3. The network communication component 712, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 712, is typically comprised of hardware and/or firmware components (and may also include or comprise executable software components) that transmit and receive digital and/or analog signals over a transmission medium (i.e., the network).

The exemplary computing device 700 further includes a predictive framework 100 that comprises plural neural layers 714. Moreover, these neural layers include at least an encoding layer 102, as well as an optional condensing layer 104 and an optional residual layer 106. Further still, in addition to the encoding, condensing and residual layers, the predictive framework 100 includes plural middle layers, as discussed above in regard to FIG. 1.

Also included as part of the predictive framework 100 of the exemplary computing device 700 is an objective function 114. The objective function 114 utilizes the output signals of the topmost neural layer to determine predictive results regarding the basis data in accordance with a predetermined objective. As discussed above, in one embodiment the objective function determines predictive results corresponding to the likelihood of user interaction with regard to an item of content of search results, or corresponding to the likelihood of user interaction with regard to a search results page. By way of illustration and not limitation, the objective function may be trained to determine the likelihood of user interaction with regard to an advertisement on a search results page for a given search query, or the likelihood of user interaction with regard to a paid search result within a search results page. Of course, as should be readily appreciated, the predictive framework 100 could be advantageously trained according to any number of predetermined objectives such that the objective function generates predictive or interpretive results with regard to a variety of objectives outside of the domain of search results.

As shown in FIG. 7, the exemplary computing device 700 further includes a results analysis service 212. As discussed above, the results analysis module analyzes the predicted results in view of actual results (for a given set of training data) to determine whether the current model of the framework meets or exceeds one or more accuracy thresholds. Further, the results analysis service 212 generates corrective data that may be utilized by the predictive framework 100 to update one or more neurons within the various neural levels 714 through back-propagation as discussed above.

Also included in the exemplary computing device 700 is a data store 718. The data store includes/stores information for use by the predictive framework 100 including one or more sets of training data 724-728 with corresponding actual results 734-738. Further, the data store 718 includes/stores one or more validation sets 720 with corresponding actual results 722.

Regarding the various components of the exemplary computing device 700, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Moreover, in certain embodiments each of the various components of the exemplary computing device 700 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network.

While various novel aspects of the disclosed subject matter have been described, it should be appreciated that these aspects are exemplary and should not be construed as limiting. Variations and alterations to the various aspects may be made without departing from the scope of the disclosed subject matter.

Feature Representation

Traditional machine learning classification algorithms are supposed to make the best use of all input features to classify new instances, however simply using raw features rarely works best. Therefore, in both industry and academia, a large body of work is on engineering the transformation of raw features. One major type of transformation is to construct functions based on a combination of multiple features and use their output as the input to a learner. These are the combinatorial features, which are sometimes called cross features, or multi-way features.

The power of combinatorial features comes with high cost. There is a steep learning curve to climb before an individual can start to create meaningful features. As the number of features grows, managing, maintaining, and deploying them becomes challenging. In web-scale applications, finding additional combinatorial features to improve an existing model is a daunting task due to the combinatorial nature, and the slow turnaround in the training and evaluation cycle given billions of samples.

Embodiments discussed herein takes individual features such as text, categorical, ID, and numerical features, and searches for the optimal combinations automatically based on the task. The embodiments below are designed to handle web-scale applications and data sizes. This is because there are not many options for general purpose models operating at this scale.

One example context for embodiments disclosed herein is the context of sponsored search of a major search engine. In brief, sponsored search is responsible for showing ads alongside organic search results. There are three major players in the ecosystem: the user, the advertiser, and the search platform. The goal of the platform is to show the user the advertisement that best matches the user intent, which was expressed mostly through a specific query. Below are concepts related to the context of sponsored search:

Query: A text string the user types into the search box.
Keyword: A text string related to the product, specified by the advertiser to match a user query.
Title: The title of a sponsored advertisement (also referred to as an "ad"), specified by an advertiser to capture a user's attention.
MatchType: An option given to the advertiser on how closely the keyword should be matched by the user query, usually one of four kinds: exact, phrase, broad and contextual.
Campaign: A set of ads that share the same settings such as budget and location targeting, often used to organize products into categories.
Landing page: The product's web site the user reaches when the corresponding ad is clicked by the user.
Impression: An instance of an ad being displayed to a user. An impression is usually logged with other information available at run-time.
Click: An indication of whether an impression was clicked by a user. A click is usually logged with other information available at run-time.
Click through rate: Total number of clicks over total number of impressions.
Click prediction: A model of the platform that predicts the likelihood a user clicks on a given ad for a given query.
Good click prediction: A model of the platform that predicts the likelihood a user will actually pay attention to the landing page after clicking on the ad.

Sponsored search is only one kind of web-scale application. However, given the richness of the problem space, the various types of features, and the sheer volume of data, the embodiments herein can be applied to other contexts with similar scale.

This section defines and compares combinatorial features and individual features, using examples listed in Table 1. The features in the table are available during run-time when an ad is displayed (an impression). They are also available in offline logs for model training, etc.

Table 1: Examples of Individual Features

TABLE 1

Examples of Individual Features

| Feature Name | Type | Dimension |
| --- | --- | --- |
| Query | Text | 49292 |
| Keyword | Text | 49292 |
| Title | Text | 49292 |
| MatchType | Category | 4 |
| CampaignID | ID | 10001 |
| CampaignIDCount | Numerical | 5 |

The examples of individual features in Table 1 are representative of features that can occur in an advertising context. The example features of Table 1 are shown in the list above.

Each individual feature $X_i$ is represented as a vector. For text features such as a query, one option is to covert the string into a tri-letter gram with 49292 dimensions as in P. S. Huang, X. He, J. Gao, L. Deng, A. Acero, and L. Heck, Learning deep structured semantic models for web search using clickthrough data, in *Proceedings of the 22nd ACM international conference on Conference on information 8 knowledge management*, pages 2333-2338. ACM, 2013. Categorical input such as MatchType is represented by a one-hot vector, where exact match is [1, 0, 0, 0], phrase match is [0, 1, 0, 0], and so on.

There are usually millions of campaigns in a sponsored search system. Simply converting campaign ids into a one-hot vector will significantly increase the size of the model. One solution is to use a pair of companion features as exemplified in the table, where CampaignID is a one-hot representation consisting only of the top 10,000 campaigns with the highest number of clicks. The $10,000^{th}$ slot (index starts from 0) is saved for all the remaining campaigns. Other campaigns are covered by CampaignIDCount, which is a numerical feature that stores per campaign statistics such as click through rate. Such feature will be referred to as a counting feature in the following discussions. All the features introduced so far are sparse features except the counting feature.

Given individual features $X_i \in \mathbb{R}^{n_i}$, and $X_j \in \mathbb{R}^{n_j}$, a combinatorial feature $X_{i,j}$, is defined in $\mathbb{R}^{n_i} \times \mathbb{R}^{n_j}$. Combinatorial features also have sparse and dense representations. An example of sparse representation is a Title×MatchType feature, which is a one-hot vector of 49292×4=197168 dimensions. An example of a dense representation counts how many ad clicks for a specific Title and Match Type combination. The dimension for the dense representation is the same as its sparse counterpart.

The embodiment described in conjunction with FIG. 8 below avoids using combinatorial features. It works with both sparse and dense individual features and supports a broad range of feature types described above. This gives users the freedom to use the features of their choice from real applications. While collecting features and converting them into the right representations still requires a significant amount of effort, the work stops at the level of individual features, while the architecture of FIG. 8 takes care of the rest.

Model Architecture

Figure 8:
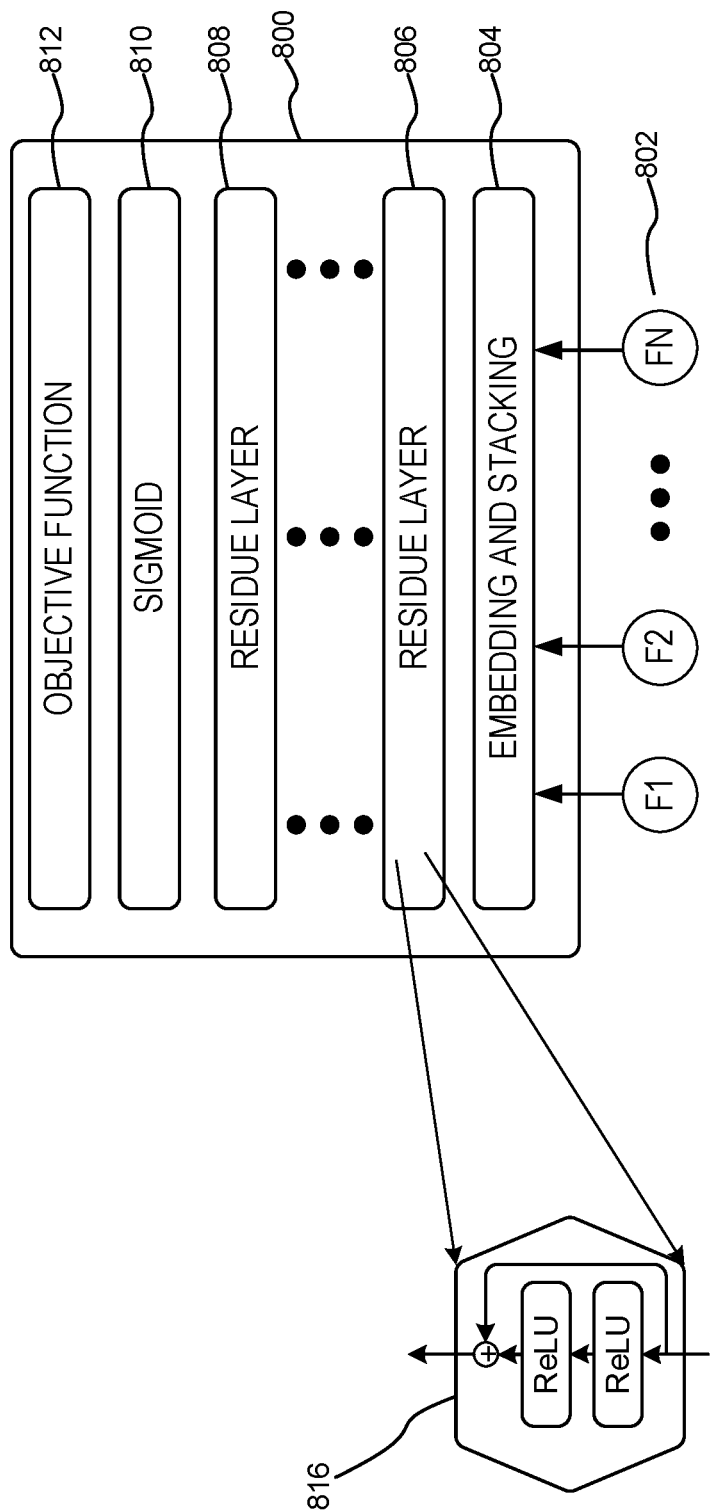
FIG. 8 illustrates a representative architecture of an exemplary network environment according to some aspects of the present disclosure.

FIG. 8 illustrates a representative architecture 800 of an exemplary network environment according to some aspects of the present disclosure, where the input is a set of features, F1, F2, . . . , Fn, as illustrated by 802. The embodiment illustrated has three types of layers, the embedding and stacking layer 804, the residual layer(s) 806.808 (also called a residue layer), and the sigmoid layer 810. The objective function 812 is the log loss for some embodiments but can also be a soft-max or other function in other embodiments. The log loss is defined as:

$$logloss = -1/N \sum_{i=1}^{N}(y_i \log(p_i) + (1-y_i)\log(1-p_i)) \quad (1)$$

where i indexes to the training samples, N is the number of samples, $y_i$ is the per sample label, and p is the output of the one node sigmoid layer 810.

Embedding and Stacking Layer

Embedding is applied per individual feature level to transform the input features. It takes the general form as below:

$$X_j^O = \max(0, W_j X_j^I + b_j) \quad (2)$$

where j indexes the individual feature, $X_j^I \in \mathbb{R}^{n_j}$ are the input feature, $W_j$ is an $m_j \times n_j$ matrix, $b \in \mathbb{R}^{n_j}$, and $X_j^O$ is the embedded feature. When $m_j \le n_j$, embedding is used to reduce the dimensionality of the input feature. The per element max operator is usually referred to as a rectified linear unit (ReLU) in the context of neural networks. The output features are then concatenated into one vector as the input into the next layer (i.e., the residue layer 806):

$$X^O = [X_0^O, X_1^O, \ldots, X_K^O] \quad (3)$$

where K is the number of input features. Note that both $\{W_j\}$ and $\{b_j\}$ are the parameters of the network and will be optimized together with the other parameters in the network. This is an important property in the embodiment of FIG. 8. Unlike the embedding only approaches such as word2vec (disclosed in T. Mikolov, I. Sutskever, K. Chen, G. S. Corrado, and J. Dean. Distributed representations of words and phrases and their compositionality. In *Advances in neural information processing systems*, pages 3111-3119, 2013.), it is an integral part of the overall optimization process.

It should be pointed out that the size of the embedding layers has significant impact on the overall size of the model. Even for sparse features, the $m_j \times n_j$ matrices become dense after the completion of the training process. This is why the embodiment uses companion features (discussed above) to constrain the dimensionality of high cardinality features. For click prediction experiments that were performed, the total size of the input features is around 200,000, and the $m_j$ for the high dimensional features such as query and keyword are uniformly set to 256. Features with dimensionality lower than 256 are concatenated without embedding.

Residual Layers

The residual layers are constructed from the residual unit 816. The residual unit 816 is similar to those used in image processing. The difference is that residual unit 816 doesn't use convolution kernels. To the inventor's knowledge, this is the first time residual units have been used to solve problems beyond image recognition.

The unique property of the residual unit is to add back the original input feature after passing it through two layers of ReLU transformations. Specifically:

$$X^O = \mathcal{F}(X^I, \{W_j\}, \{b_j\}) + X^I \quad (4)$$

where $\mathcal{F}$ denotes the function that maps the input $X_I$ of the residual unit to the output $X_O$. Moving $X_I$ to the left side of equation (4), $\mathcal{F}(\cdot)$ is essentially fitting the residual of $X^O - X^I$.

In experiments, the embodiment of FIG. 8 was applied to a wide variety of tasks. It was also applied to training data with large differences in sample sizes. In all cases, the same model was used without any adjustment in the layers, nodes, and type of nodes. It's likely that residual unit 816 is implicitly performing some kind of regularization that leads to such stability.

EXAMPLE IMPLEMENTATION

An example implementation was made on a multi-GPU platform powered by the Computational Network Toolkit (CNTK) which shares the same theoretical foundation of a computational network with Tensor Flow but naturally supports multiple GPUs.

Building example implementations is quite straight forward with CNTK. The script below defines a few Macros that will be used later.

```
ONELAYER(Dim_XO,Dim_XI, XI)
{
W=Parameter(Dim_XO, Dim_XI)
b=Parameter(Dim_XO)
XO=Plus(Times(W, XI), b)
}
ONELAYERSIG(Dim_XO,Dim_XI, XI)
{
t=ONELAYER(Dim_XO,Dim_XI, XI)
XO=Sigmoid(t)
}
ONELAYERRELU(Dim_XO,Dim_XI, XI)
{
t=ONELAYER(Dim_XO,Dim_XI, XI)
XO=ReLU(t)
}
ResidualUnit(Dim_H, Dim_XI, XI)
{
L1=ONELAYERRELU(Dim_H,Dim_XI, XI)
L2=ONELAYERRELU(Dim_XI,Dim_H, L1)
XO=ReLU(Plus(XI, L2))
}
```

The macro ONELAYER creates a weight matrix Wand a bias vector b for one layer of a network. Macros ONELAYERSIG and ONELAYERRELU apply element-wise Sigmoid and ReLU functions to the output of ONELAYER and build a full Sigmoid layer and a ReLU layer, respectively. Comparing side-by-side ONELAYERRELU and Equ. 2, XI, XO, Dim_XI, and Dim_XO are $X_j^I$, $X_j^O$, $n_j$, and $m_j$, respectively. The ResidualUnit uses a hidden layer of Dim_H, but the output has the same dimension as Dim_XI. The script below has the details of the actual example implementation when applied to the features in Table 1. As can be seen from the script, the full model has five steps. Each step has been described above. Since the MatchType feature M has only 4 dimensions, it goes directly to the stacking stage without embedding. This is why the embedding step and the stacking step are regarded as a single, combined step. Dim_E and Dim_CROSS* are the numbers of nodes in the embedding layer and the hidden layer inside the Residual Unit, respectively. Dim_L=1 for log loss. Some details such as feature I/O and normalization are not included here for simplicity.

Example Implementation—5 residual layers described in CNTK modeling language

Step 1: Read in features, omitted

Step 2A: Embedding

Q=ONELAYERRELU(Dim_E,Dim_Query, Query)

K=ONELAYERRELU(Dim_E,Dim_Keyword, Keyword)

T=ONELAYERRELU(Dim_E,Dim_Title, Title)

C=ONELAYERRELU(Dim_E,Dim_CampaignID, CampaignID)

Step 2B: Stacking

M=MatchType, CC=CampaignIDCount

Stack=RowStack(Q, K, T, C, M, CC)

Step 3: Deep Residual Layers r1=ResidualUnit(Dim_CROSS1, Dim_Stack, Stack)

r2=ResidualUnit(Dim_CROSS2, Dim_Stack, r1)

r3=ResidualUnit(Dim_CROSS3, Dim_Stack, r2)

r4=ResidualUnit(Dim_CROSS4, Dim_Stack, r3)

r5=ResidualUnit(Dim_CROSS5, Dim_Stack, r4)

Step 4: Final Sigmoid Layer

Predict=ONELAYERSIG(Dim_L, Dim_Stack, r5)

Step 5: Log Loss Objective

CE=LogLoss(Label, Predict)

CriteriaNodes=(CE)

Thus, as shown, the example implementation returns a prediction to the calling entity based on the input, which in this example is Query, Keyword, Title, CampaignID, MatchType, and CampaignIDCount, as shown in Table 1.

EXPERIMENTATION

The example implementation was trained and evaluated on impression and click logs of a major search engine. Table 2 lists the data sets used for the experiments in this section. Each experiment will use a combination of training, validation, and test data sets, referred by the names in the "Data Set" column. Only data sets in the same "Group" are compatible, meaning that there is no overlap in time for different "Types". For example, a model trained with all_cp_tn_b (the last row in the table) can be validated with all_cp_vd and tested with all_cp_tt since they all belong to the G_3 group.

The "Source" of data sets is either from impression (Imp.) logs or from the click (Clk.) logs. Different logs have different kinds of information available. For instance, landing page titles are only available in the click log. Features are converted into representations discussed above. The label data for Imp. and Clk. data are user clicks, and good clicks, respectively. A good click is when a user clicks on an ad and dwells on the landing page for more than 20 seconds.

TABLE 2

Data Sets. Rows (in Millions) is the number of samples in the data set, while Dims (in thousands) is the input dimension of all features added together.

| Data Set | Group | Source | Type | Rows | Dims |
|---|---|---|---|---|---|
| text_cp_tn_s | G_1 | Imp. | train | 194 | 98.5 |
| text_cp_vd | G_1 | Imp. | valid | 49 | 98.5 |
| text_cp_tt | G_1 | Imp. | test | 45 | 98.5 |
| text_cp_tn_b | G_1 | Imp. | train | 2930 | 98.5 |
| text_gc_tn | G_2 | Clk. | train | 518 | 98.5 |
| text_dc_vd | G_2 | Clk. | valid | 100 | 98.5 |
| text_gc_tt | G_2 | Clk. | test | 93 | 98.5 |
| all_cp_tn_s | G_3 | Clk. | train | 111 | 202.7 |
| all_cp_vd | G_3 | Clk. | valid | 139 | 202.7 |
| all_cp_tt | G_3 | Clk. | test | 156 | 202.7 |
| all_cp_tn_b | G_3 | Clk. | train | 2237 | 202.7 |

The example implementation described above was used for all the experiments. Model parameters are also fixed to 256, 512, 512, 256, 128, and 64 for Dim_E, and Dim_CROSS[1-5], respectively.

The example implementation (referred to in the results tables below and in this section as Deep Crossing) is compared to Deep Semantic Similarity Model (DSSM). DSSM learns the semantic similarity between a pair of text strings, each represented by a sparse representation called tri-letter grams. The learning algorithm optimizes an objective function based on Cosine distance by embedding the tri-letter grams into two vectors. The learned embedding captures the semantic meaning of words and sentences, and has been applied to sponsored search, question answering, and machine translation with strong results. DSSM in the experiments is specialized.

For an apple-to-apple comparison, both DSSM and Deep Crossing use a pair of inputs that include query text and keyword text, each represented by a tri-letter gram vector.

In the first experiment, click prediction models were trained on two data sets listed in Table 3. In both cases, Deep Crossing outperforms DSSM in terms of AUC. Note that the DSSM model used here is a log loss version.

TABLE 3

Click prediction results with a pair of text inputs. Performance is measured by AUC.

| Training Data | DSSM | Deep Crossing |
|---|---|---|
| text_cp_tn_s | 0.6714 | 0.6745 |
| text_cp_tn_b | 0.6915 | 0.6986 |

In the second experiment, both models were trained on text.gc_tn, and tested on text_gc_tt, respectively. The input features are the tri-letter grams of query text and landing page title. Table 4 shows the performance results for DSSM, Deep Crossing, and the model currently running inside our production system. The production model is trained on a different data set, but is tested with the same data (text_gc_tt) using the prediction output logged during the runtime. It can be seen that Deep Crossing performs better than DSSM but worse than Production. This is expected since the production model uses more features including combinatorial features and has been refined over many years. Still, by just using individual query text and landing page title features, Deep Crossing is about one percentage point away from the production model.

TABLE 4

Good click prediction results with a
pair of text inputs. Performance is measured
by AUC percentage of the production model.

| Test Data | DSSM | Deep Crossing | Production |
|---|---|---|---|
| text_gc_tt | 98.68 | 98.99 | 100 |

Deep Crossing is not specially tuned for pairs of text inputs. The real power of Deep Crossing is to work with many individual features.

What is claimed:

1. A non-transitory computer-readable medium comprising executable instructions that, when executed by at least one processor of a machine, cause the machine to implement a computer-implemented framework for providing predicted results, comprising:
  a plurality of neural layers comprising:
    an encoding layer comprising a plurality of encoding neurons each having an input for receiving a corresponding input signal from a set of input data to evaluate and an output comprising a signal embedding for the input signal;
    a plurality of residual layers each comprising a plurality of residual neurons, each residual neuron comprising a plurality of rectified linear operations without convolutional operations and a summation operation to add back elements of an input to the residual neuron, one of the plurality of residual layers being connected to the encoding layer and the other residual layers being connected to at least one other residual layer; and
    an objective function that, in execution, determines predicted results from output signals of a topmost residual layer according to a predetermined objective;
    wherein, in execution, the framework obtains the input signals by way of the encoding layer and processes the input signals successively through the plurality of neural layers to the topmost residual layer; and
    wherein the objective function determines the predicted results from the output signals of the topmost residual layer according to the predetermined objective and provides the predicted results to a requesting party.

2. The medium of claim 1, wherein the input signals comprise one or more of:
  user identification;
  query;
  subject matter of a query;
  entity of a query;
  keywords;
  advertiser;
  advertisement campaign;
  time of day;
  day of week;
  holiday;
  season;
  gender of a user, and
  advertisement.

3. The medium of claim 1, wherein the predetermined objective of the objective function is to determine a probability of user interaction with regard to a specific item of content in a set of search results.

4. The medium of claim 3, wherein the specific item of content in the set of search results comprises an advertisement in the set of search results.

5. The medium of claim 3, wherein the specific item of content in the set of search results comprises a sponsored search result in the set of search results.

6. The medium of claim 1, wherein the predetermined objective of the objective function is to determine a probability of user interaction with regard to any item of content in a set of search results.

7. A computer system configured to generate predicted results with regard to base data, the computer system comprising a processor and a memory, wherein the processor executes instructions stored in the memory as part of or in conjunction with additional executable components to generate the predicted results, comprising:
  an executable predictive framework, wherein the predictive framework comprises:
    a plurality of neural layers comprising an encoding layer and a plurality of residual layers, wherein:
      each neural layer comprises a plurality of neurons, each neuron comprising an executable object that accepts one or more inputs from a lower layer and generates an output; and
      the encoding layer is a lowest neural layer comprising a plurality of encoding neurons having a 1:1 correspondence with a plurality of input signals;
      the plurality of residual layers comprising a plurality of residual neurons, each residual neuron comprising a plurality of rectified linear operations without convolutional operations and a summation operation to add back elements of an input to the residual neuron, one of the plurality of residual layers being connected to the encoding layer and the other residual layers being connected to at least one other residual layer; and
    an objective function that, in execution, determines predicted results from output signals of a topmost residual layer according to a predetermined objective;
    wherein, in execution, the framework obtains the input signals by way of the encoding layer and processes the input signals successively through the plurality of neural layers to the topmost residual layer; and
    wherein the objective function determines the predicted results from the output signals of the topmost residual layer according to the predetermined objective and provides the predicted results to a requesting party.

8. The computer system of claim 7, wherein the input signals comprise one or more of:
  user identification;
  query;
  subject matter of a query;
  entity of a query;
  keywords;
  advertiser;
  advertisement campaign;
  time of day;
  day of week;
  holiday;
  season;
  gender of a user, and
  advertisement.

9. The computer system of claim 7, wherein the predetermined objective of the objective function is to determine a likelihood of user interaction with regard to a specific item of content in a set of search results.

10. The computer system of claim 7, wherein the predetermined objective of the objective function is to determine a likelihood of user interaction with regard to any item of content in a set of search results.

11. A computer-implemented method for determining predicted results for a set of data, the method comprising:
- providing an executable predictive framework having a validated model, the executable predictive framework comprising:
  - a plurality of neural layers comprising a plurality of residual layers and an encoding layer, wherein:
    - each neural layer comprises a plurality of neurons, each neuron comprising an executable object that accepts one or more inputs and generates an output; and
    - the encoding layer is a lowest neural layer and comprises a plurality of encoding neurons having a 1:1 correspondence with a plurality of input signals;
    - each residual layer residing above the encoding layer, one of the plurality of residual layers being connected to the encoding layer and the other residual layers being connected to at least one other residual layer, each residual layer comprising a plurality of residual neurons, each residual neuron comprising a plurality of rectified linear operations without convolutional operations and a summation operation to add back elements of an input to the residual neuron; and
  - an objective function that, in execution, determines the predicted results from output signals of a topmost residual layer according to a predetermined objective;
  - wherein, in execution, the framework obtains the input signals by way of the encoding layer and processes the input signals successively through the plurality of neural layers to the topmost residual layer; and
  - wherein the objective function determines the predicted results from the output signals of the topmost residual layer according to the predetermined objective and provides the predicted results to a requesting party;
- obtaining the input signals for processing by the predictive framework;
- processing the input signals by the predictive framework:
- obtaining the predicted results from the objective function; and
- providing the predicted results to the requesting party.

12. The computer-implemented method of claim 11, wherein the predetermined objective of the objective function is to determine a probability of user interaction with regard to a specific item of content in a set of search results.

* * * * *